(12) United States Patent
de Lore et al.

(10) Patent No.: US 10,011,432 B2
(45) Date of Patent: Jul. 3, 2018

(54) BRAKE SYSTEM FOR CONVEYOR TAKE-UP MECHANISM

(71) Applicant: Joy MM Delaware, Inc., Wilmington, DE (US)

(72) Inventors: Andrew P. de Lore, Yattalunga (AU); Matthew John Croker, Burradoo (AU)

(73) Assignee: Joy Global Underground Mining LLC, Warrendale, PA (US)

(*) Notice: Subject to any disclaimer, the term of this patent is extended or adjusted under 35 U.S.C. 154(b) by 0 days.

(21) Appl. No.: 15/848,062

(22) Filed: Dec. 20, 2017

(65) Prior Publication Data

US 2018/0111763 A1 Apr. 26, 2018

Related U.S. Application Data

(63) Continuation of application No. 15/288,742, filed on Oct. 7, 2016, now Pat. No. 9,868,592.

(60) Provisional application No. 62/238,563, filed on Oct. 7, 2015.

(51) Int. Cl.
*B65G 23/44* (2006.01)
*B65G 21/14* (2006.01)
*B65G 23/00* (2006.01)

(52) U.S. Cl.
CPC ........ *B65G 23/44* (2013.01); *B65G 2201/045* (2013.01)

(58) Field of Classification Search
CPC ........ B65G 23/44; B65G 21/14; B65G 23/00; B65G 2201/045
USPC .................................. 198/810.01, 812, 813
See application file for complete search history.

(56) References Cited

U.S. PATENT DOCUMENTS

| 3,275,126 A | * | 9/1966 | Hartzell, Jr. | ........... | B65G 23/44 198/815 |
| 3,370,693 A | * | 2/1968 | Marsden | ................ | B65G 21/14 198/460.2 |
| 3,638,781 A | * | 2/1972 | Comley | ................ | B65G 23/44 198/810.04 |
| 3,923,151 A | * | 12/1975 | Weber | .................... | B65G 23/00 198/810.04 |

(Continued)

OTHER PUBLICATIONS

International Search Report and Written Opinion for Application No. PCT/2016/056103 dated Dec. 23, 2016 (12 pages).

*Primary Examiner* — Douglas A Hess
(74) *Attorney, Agent, or Firm* — Michael Best & Friedrich LLP

(57) ABSTRACT

A tensioning mechanism for a conveyor system includes a support structure, a first carriage, a second carriage, and a brake mechanism. The first carriage is positioned proximate a first end of the support structure and is supported for movement relative to the support structure. The first carriage includes first rolls for receiving the belt such that movement of the first carriage modifies a tension in the belt. The second carriage is supported for movement relative to the support structure and includes second rolls and at least one return pulley. The second rolls are configured to support a portion of the belt extending between the first carriage and the second carriage. The brake mechanism is positioned proximate a second end of the support structure and includes a brake pulley and a brake selectively retarding rotation of the brake pulley. The brake pulley supports a portion of the belt extending between the brake mechanism and the return pulley.

20 Claims, 12 Drawing Sheets

(56) References Cited

U.S. PATENT DOCUMENTS

| | | | | |
|---|---|---|---|---|
| 4,339,031 A * | 7/1982 | Densmore | ............... | B61B 13/10 |
| | | | | 198/830 |
| 4,622,024 A * | 11/1986 | Lawson | ................... | F16H 7/08 |
| | | | | 254/228 |
| 5,322,154 A * | 6/1994 | Lenherr | ................. | B65G 21/14 |
| | | | | 198/460.2 |
| 6,029,799 A * | 2/2000 | Weigel | ................... | B65G 23/36 |
| | | | | 198/810.04 |
| 6,305,525 B1 * | 10/2001 | Miller | ................... | B65G 21/14 |
| | | | | 198/460.2 |
| 7,222,722 B2 * | 5/2007 | Voigtlander | ........... | B65G 21/14 |
| | | | | 198/594 |
| 7,588,139 B1 * | 9/2009 | Campbell, III | ...... | B65G 15/105 |
| | | | | 198/407 |
| 7,866,462 B2 * | 1/2011 | DeMong | .............. | B65G 41/005 |
| | | | | 198/300 |
| 8,191,703 B2 * | 6/2012 | Tokhtuev | ............... | B65G 43/02 |
| | | | | 198/810.04 |
| 9,056,723 B2 * | 6/2015 | Biggel | ................... | B65G 21/14 |
| 9,221,617 B2 * | 12/2015 | Waller | ................... | B65G 23/44 |
| 9,868,592 B2 * | 1/2018 | de Lore | ................. | B65G 23/44 |
| 2014/0330430 A1 * | 11/2014 | Waller et al. | | |

* cited by examiner

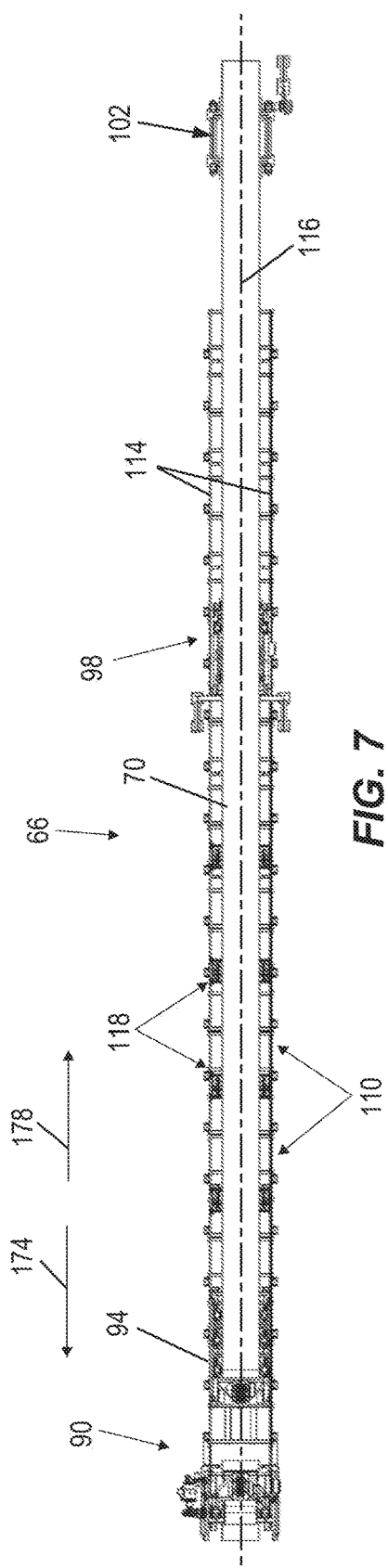
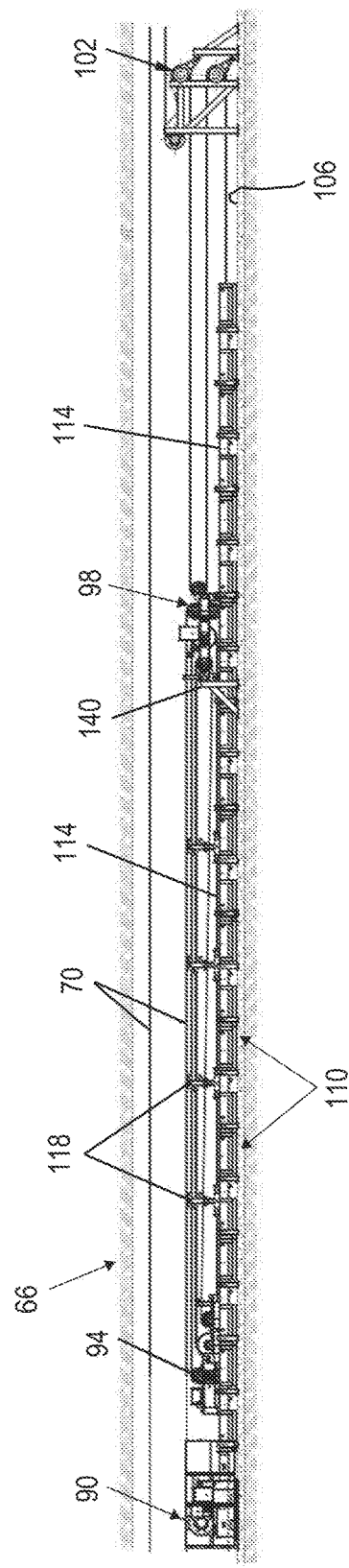
FIG. 7
FIG. 8

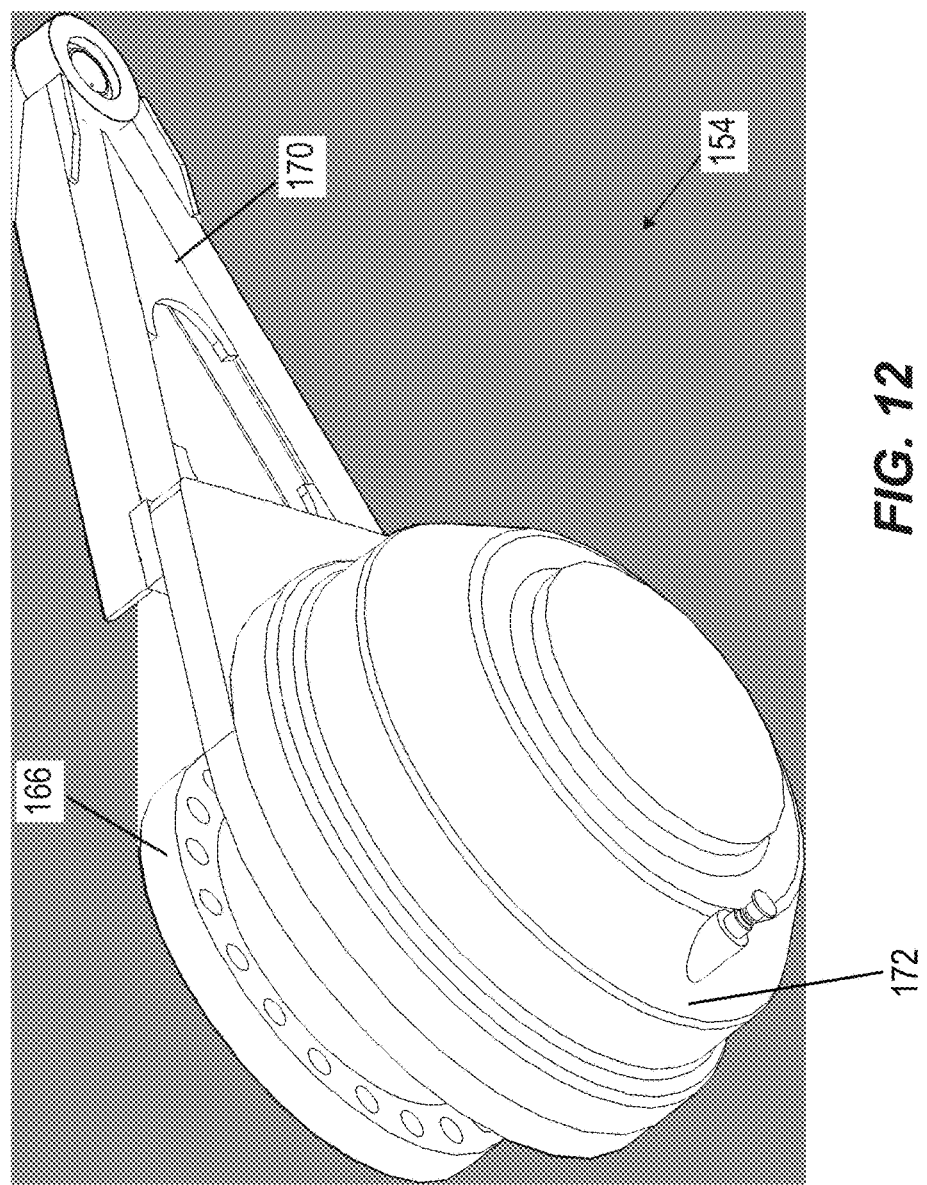

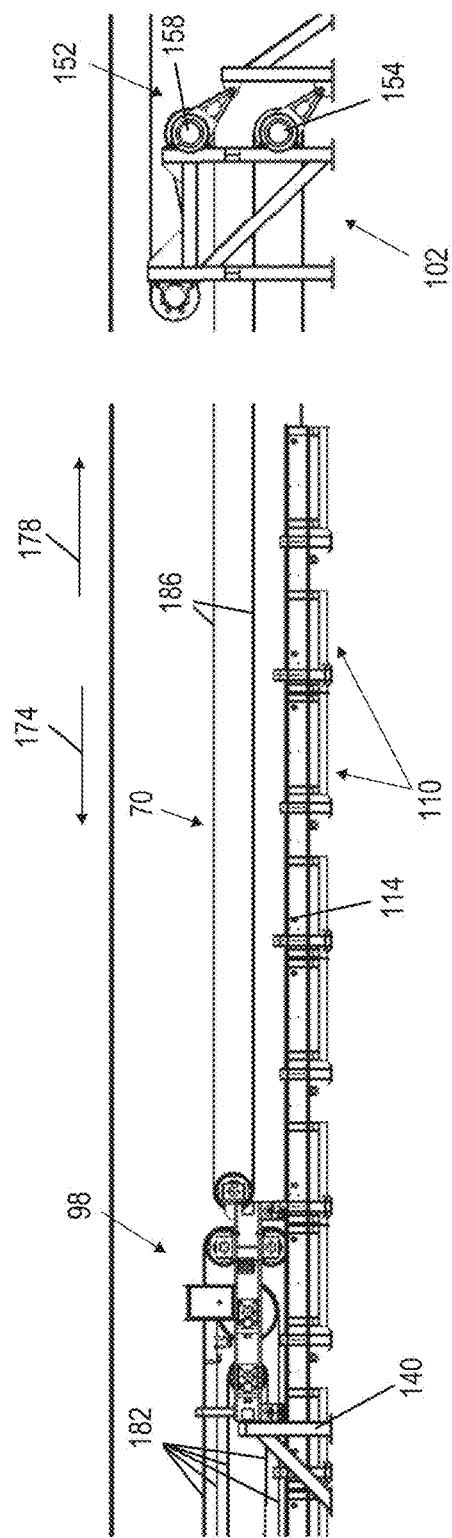
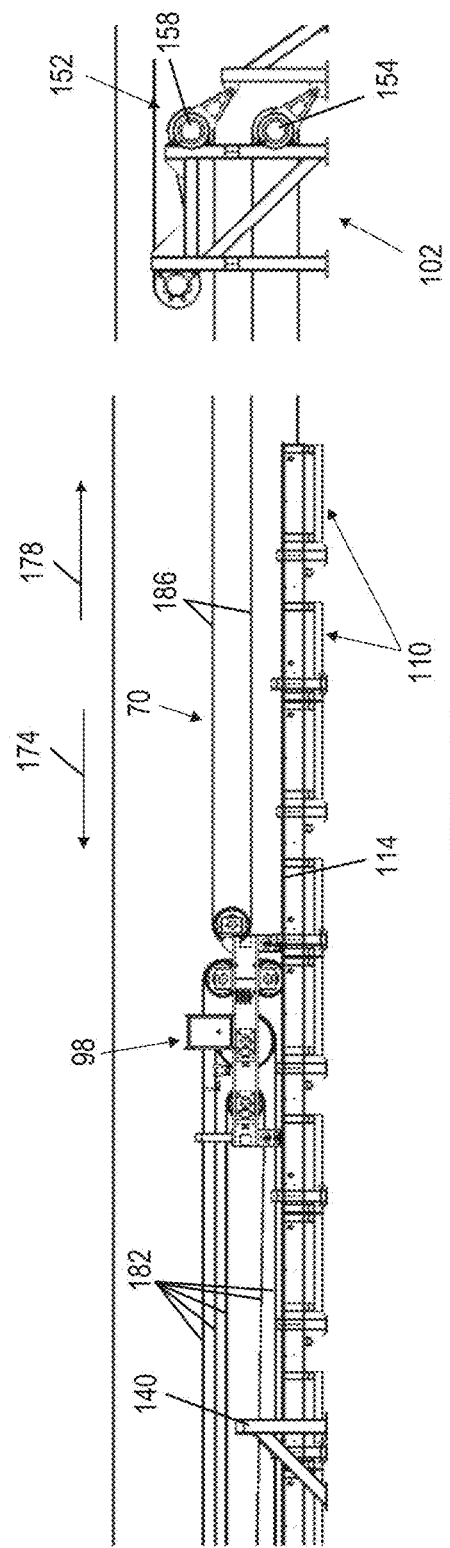

BRAKE SYSTEM FOR CONVEYOR TAKE-UP MECHANISM

CROSS-REFERENCE TO RELATED APPLICATION

This application is a continuation of prior-filed, co-pending U.S. patent application Ser. No. 15/288,742, filed Oct. 7, 2016, which claims the benefit of U.S. Provisional Patent Application No. 62/238,563, filed Oct. 7, 2015. The entire contents of these applications are incorporated by reference herein.

BACKGROUND

The present disclosure relates to the field of conveyor systems and particularly to a brake system for a tensioning or take-up mechanism of a conveyor.

Conveyor systems require a belt tensioning device, which can take many different forms. Some underground conveyor systems include a tensioning or take-up system that also provides belt storage (e.g., in a belt lap arrangement). Such a system is referred to as a loop take-up ("LTU"). As the mining operation progresses, the length of travel of the belt changes, and the LTU maintains tension in the belt to accommodate the change in length.

SUMMARY

In one aspect, a braking device is provided for a conveyor system including a continuous belt driven in a direction of travel. The braking device includes a carriage supported for movement in a direction parallel to the direction of travel of the belt, and the carriage includes a plurality of rolls and at least one return pulley. The plurality of rolls is configured to support a portion of the belt. A brake pulley is configured to support a portion of the belt extending from the return pulley, and a brake selectively retards rotation of the brake pulley.

In another aspect, a tensioning mechanism for a conveyor system includes a continuous belt and a support structure. The tensioning mechanism includes a first carriage supported for movement relative to the support structure, and a second carriage supported for movement relative to the support structure. The first carriage includes a plurality of first rolls for receiving the belt such that movement of the first carriage modifies a tension in the belt. The second carriage includes a plurality of second rolls and at least one return pulley. The plurality of second rolls is configured to receive a portion of the belt from the first carriage. A brake pulley receives a portion of the belt from the return pulley. A brake selectively retards rotation of the brake pulley.

In yet another aspect, a method for conveying material includes: driving a continuous belt between a receiving end and a discharge end, the belt including a first portion and a second portion, the first portion extending between a first carriage and a second carriage and exerting a first force on the second carriage, the second portion extending between the second carriage and at least one braking pulley and exerting a second force on the second carriage; while power is supplied to a conveyor drive motor, operating the tensioning mechanism in a first mode including selectively moving the first carriage relative to the second carriage to adjust a tension in the continuous belt, the first force being greater than the second force; and while power to the conveyor drive motor is interrupted, operating the tensioning mechanism in a second mode including retarding rotation of the at least one braking pulley, the second force being greater than the first force.

Other aspects will become apparent by consideration of the detailed description and accompanying drawings.

BRIEF DESCRIPTION OF THE DRAWINGS

FIG. 7 is a top view of a loop take-up for a gate conveyor.
FIG. 8 is a side view of the loop take-up of FIG. 7.
FIG. 12 is a perspective view of a brake.
FIG. 13 is a side view of the loop take-up during normal operation.
FIG. 14 is a side view of the loop take-up during a braking operation.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
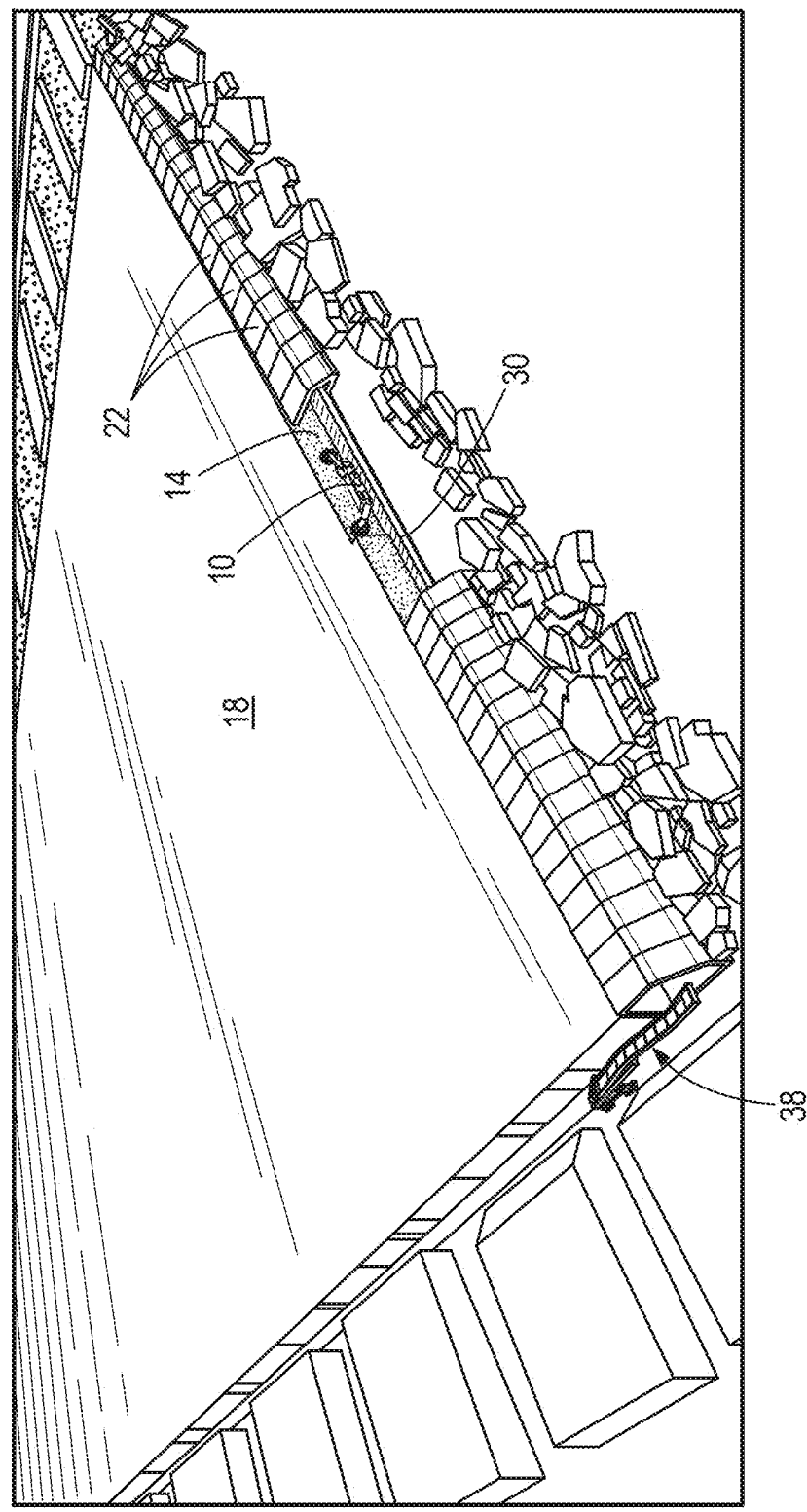
FIG. 1 is a perspective view of a mining operation.
Figure 2:
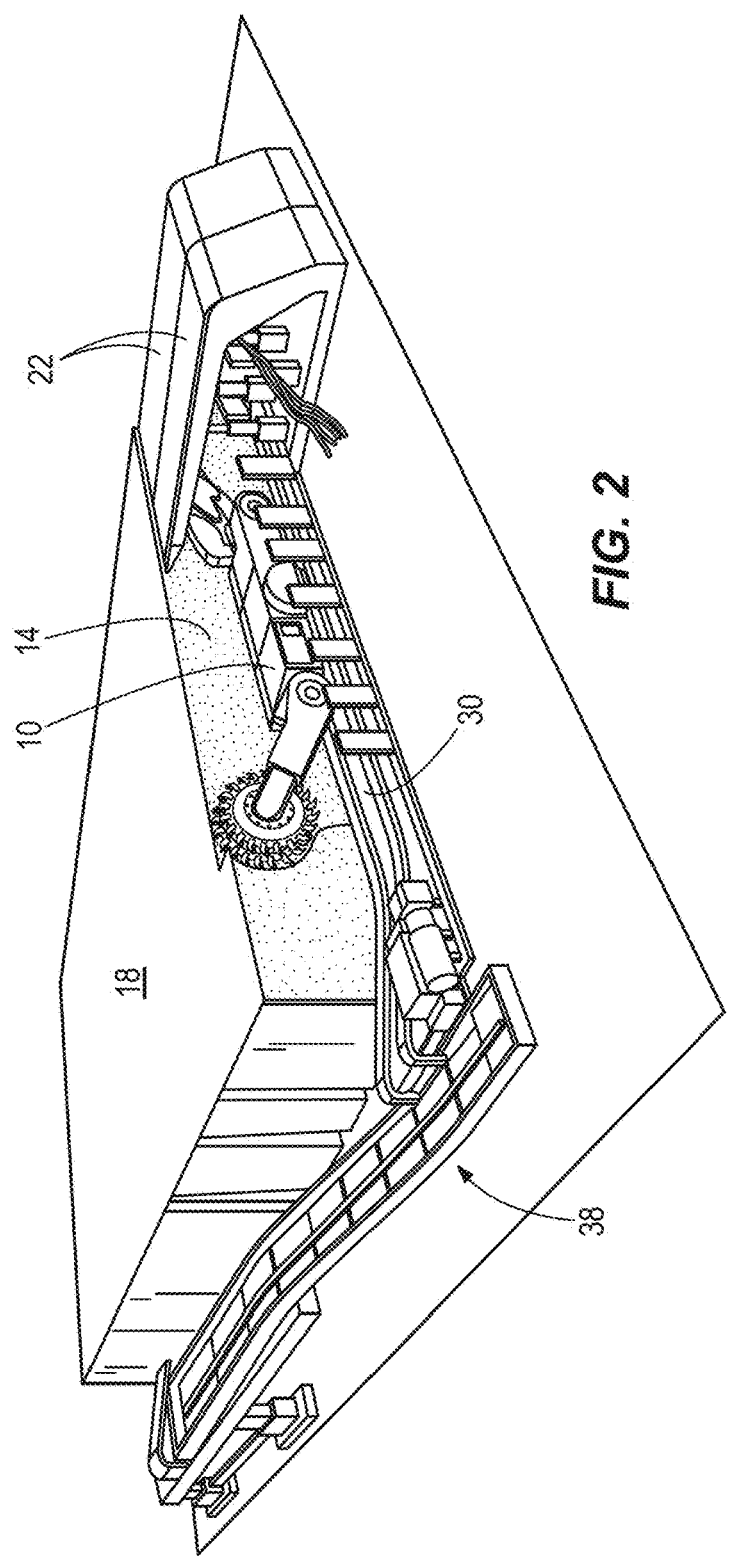
FIG. 2 is an enlarged perspective view of the mining operation of FIG. 1.

FIGS. 1 and 2 illustrate a longwall mining operation. A mining machine 10 excavates material from a mine face 14 of a mineral seam 18, progressing through the seam 18 as material is removed. In the illustrated embodiment, the mining machine 10 is a conventional longwall shearer, and the structure and operation of the shearer may be readily understood by a person of ordinary skill in the art. In other embodiments, a different type of mining machine may be used. Roof supports 22 are aligned in a row along the length of the mine face 14 to provide protection (a portion of the roof supports 22 are removed in FIGS. 1 and 2 to illustrate the mining machine 10 and the mine face 14). After the shearer 10 removes material from the mine face 14, the material is directed onto a face conveyor 30, which conveys the material generally parallel to the mine face 14. The material is then deposited on a beam stage loader 38, which may be positioned proximate an end of the face 14.

Figure 3:
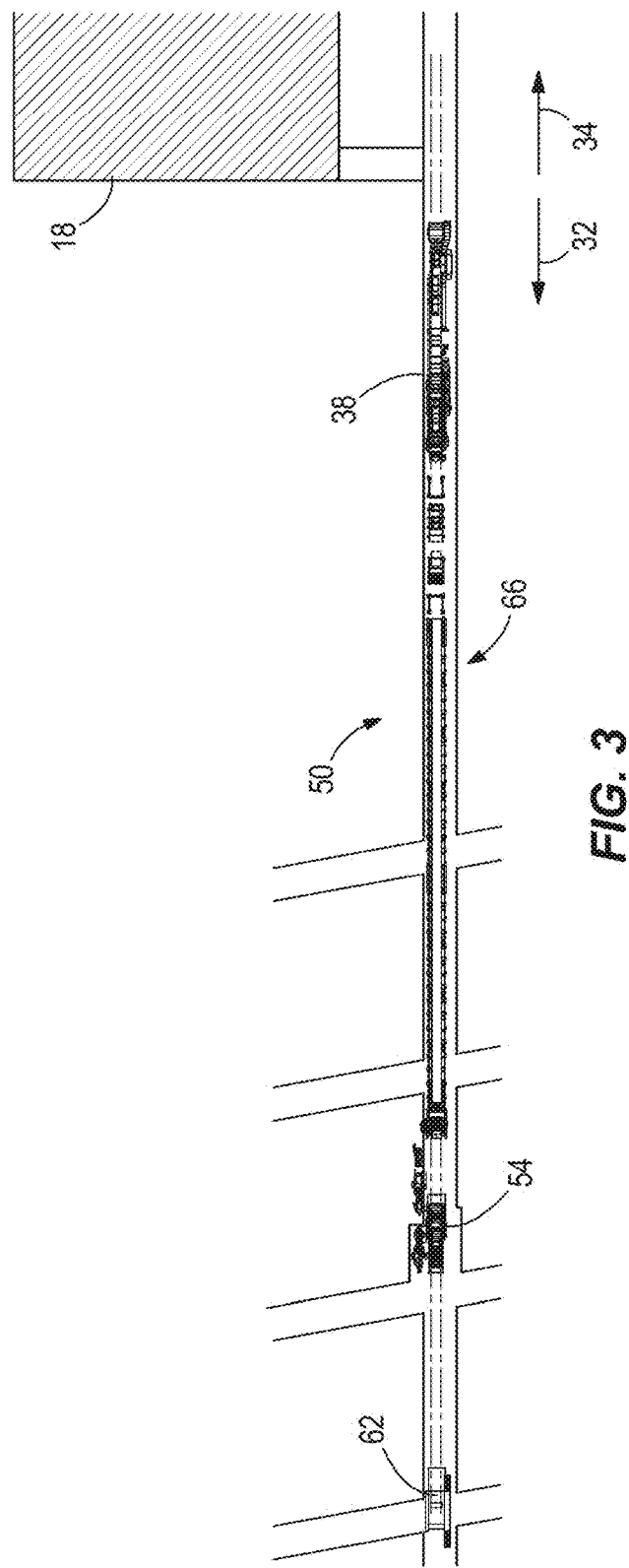
FIG. 3 is a top view of a mining operation.

As shown in FIG. 3, in the illustrated embodiment, the mining operation is "retreating" such that the shearer 10 progresses through the seam 18 in a direction oriented toward a mine exit (e.g., to the left in FIG. 3). In other embodiments, the operation may be "advancing" such that the shearer 10 progresses through the seam 18 in a direction oriented away from the mine exit.

Figure 4:
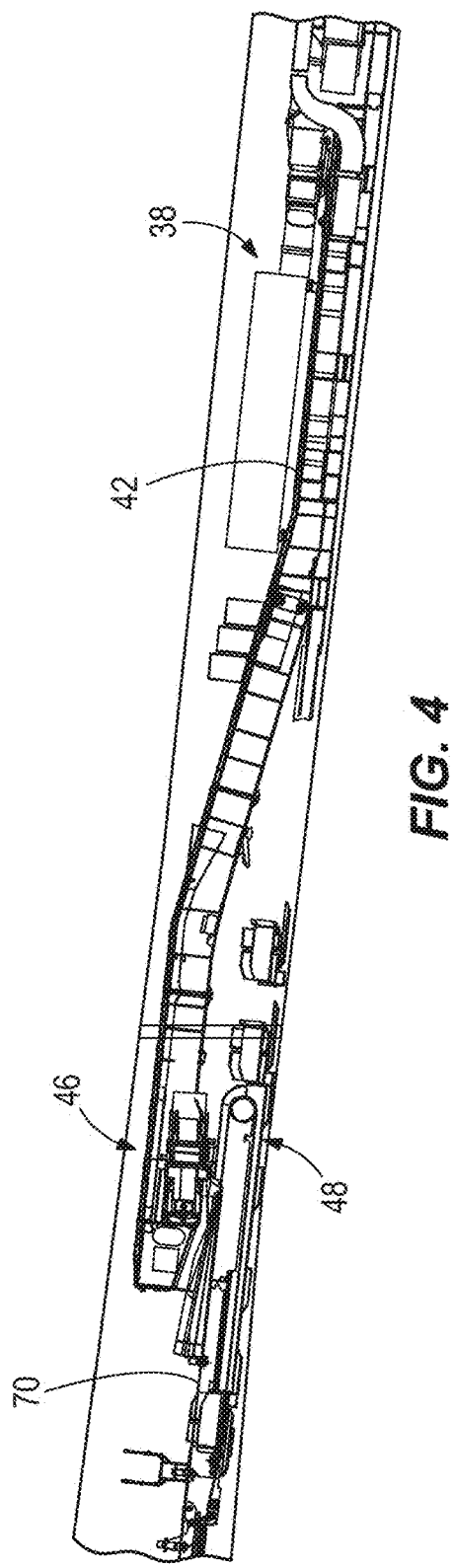
FIG. 4 is a side view of a beam stage loader.

As shown in FIG. 4, the beam stage loader 38 includes a conveyor portion 42 (e.g., a chain conveyor), and a sizer 46. The conveyor portion 42 receives the material from the face conveyor 30 and moves the material into the sizer 46, which crushes and breaks the material to reduce it to a desired size. In the illustrated embodiment, the beam stage loader 38 also supports an end 48 of the gate conveyor 50, which receives the reduced material. As shown in the side views of FIGS. 4-6, the gate conveyor 50 is generally supported on an inclined surface.

Referring again to FIG. 3, the gate conveyor 50 includes a drive unit 54, a discharge portion 62, and a tensioning mechanism or loop take-up 66 (hereinafter referred to as the "LTU"). The gate conveyor 50 also includes a belt 70 that extends in a continuous loop between the end adjacent the beam stage loader 38 and the discharge portion 62. In the illustrated embodiment, the LTU 66 is positioned out-bye of the beam stage loader 38 and in-bye of the drive unit 54. As used herein, the term "out-bye" refers to a direction away from the mine face 14, and the term "in-bye" refers to a direction toward the mine face 14. In the illustrations of FIGS. 3-8, the out-bye direction 32 is oriented toward the left, and the in-bye direction 34 is oriented toward the right.

Figure 5:
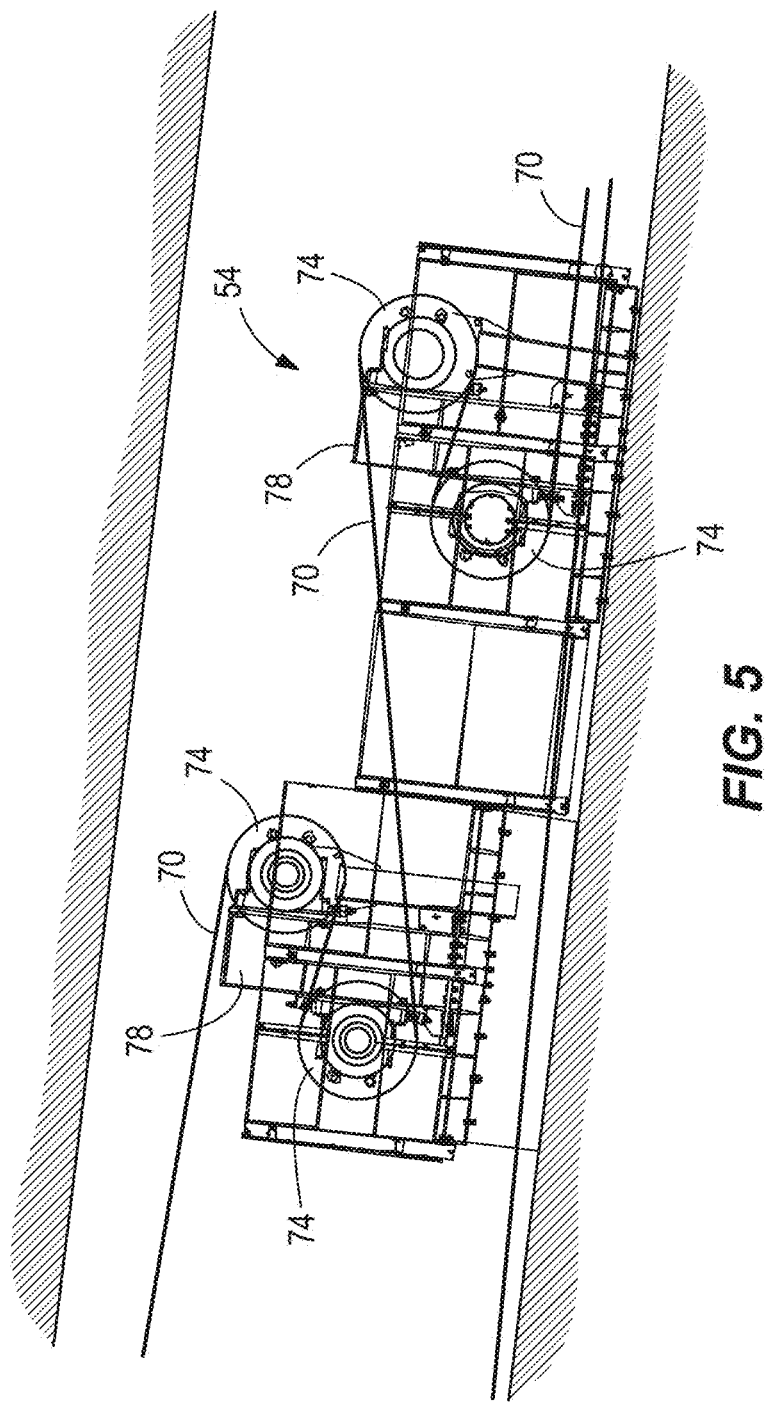
FIG. 5 is a side view of a drive unit of a gate conveyor.
Figure 6:
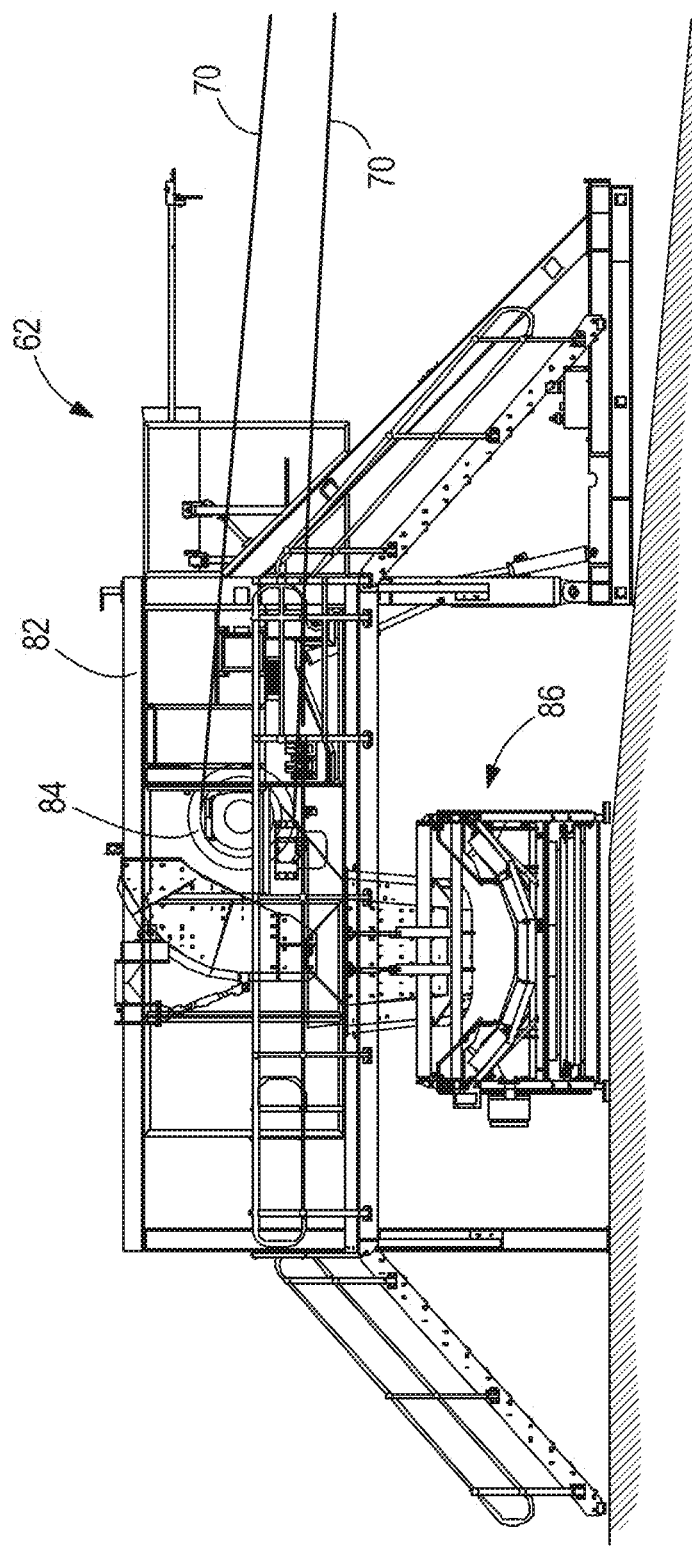
FIG. 6 is a side view of a discharge portion of a gate conveyor.

As shown in FIG. 5, the drive unit 54 includes drums or pulleys 74 and one or more motors 78 for rotating at least one of the pulleys 74. As used herein, the term "pulley" generally refers to a drum that is rotatable about its longitudinal axis, and about which a portion of the belt 70 is wrapped or bent. A pulley may be coupled to a drive motor or a brake to apply torque to the belt 70. The pulleys 74 support and move the belt 70 and transport the mined material along the gate conveyor 50, from the beam stage loader 38 to the discharge portion 62 (FIG. 6). Referring to FIG. 6, the discharge portion 62 includes a structure 82 supporting an end 84 of the belt 70. Once material reaches the end 84 of the belt 70, the material is deposited onto an auxiliary conveyor 86 and transported out of the mine. In some embodiments, the material may be deposited on a haulage vehicle instead of the auxiliary conveyor 86.

FIGS. 7 and 8 illustrate the LTU 66. Although FIGS. 7 and 8 show only the portion of the belt 70 engaging the components of the LTU 66, it is understood that the belt 70 continues to travel between the end 48 of the gate conveyor 50 proximate the beam stage loader 38 (FIG. 4) and the end 84 proximate the discharge portion 62 (FIG. 6).

The LTU 66 is a belt tensioning device and also provides storage for unused portions of the belt 70, typically in a belt lap arrangement. The storage capability permits the length of the conveyor 50 to increase or decrease in response to operation of a control module 90 that allows the belt 70 to be released (when the conveyor 50 extends) or added (when the conveyor 50 contracts).

The LTU 66 includes the control or winch module 90, a first movable module or carriage 94, a second movable carriage 98 (also referred to as a securable mobile carriage), and a stationary module or end structure or brake frame 102. The winch module 90 is positioned at a first end of the LTU 66, and the brake frame 102 defines a second end of the LTU 66. In the illustrated embodiment, the brake frame 102 is anchored or fixed to a mine floor 106 (FIG. 8). In the illustrated embodiment, the second movable carriage 98 is in-bye of the winch module 90 and out-bye of the brake frame 102.

In addition, the LTU 66 includes a support structure extending at least partially between the winch module 90 and the brake frame 102. The support structure includes standard frames or standard modules 110, and each standard module 110 is supported on the ground or mine floor 106. In the illustrated embodiment, the standard modules 110 include rolls (not shown) for supporting at least a lower run or return run of the belt 70, and rails 114 extend between adjacent standard modules 110. The rails 114 may include a V-rail (not shown) on one side and a flat surface rail on the other side. The V-rail orients the lateral position of the first movable carriage 94 (i.e., in a lateral direction that is perpendicular to the axis 116 of the belt 70). The flat surface provides support for the carriages 94, 98 while also accommodating any variation resulting from fabrication or installation alignment.

As shown in FIGS. 7 and 8, the LTU 66 further includes belt separation carriages or idler modules 118 supported on the standard modules 110 and positioned between the first carriage 94 and the second carriage 98. The idler modules 118 include idler rolls 120 (FIG. 9) for supporting strands or runs of the belt 70 positioned about the standard modules 110 and maintaining a desired separation between adjacent strands.

Figure 9:
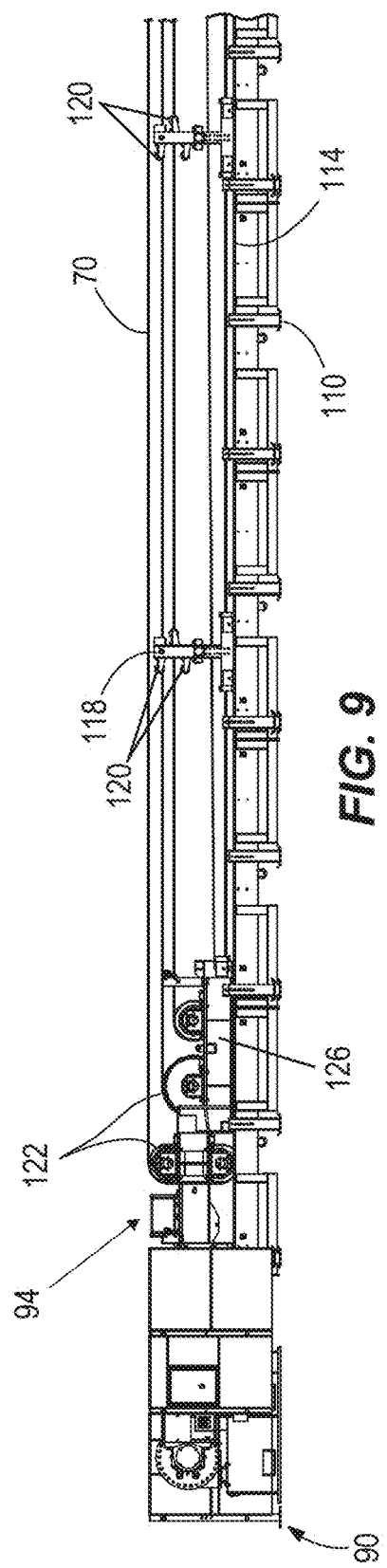
FIG. 9 is a side view of an end portion of the loop take-up of FIG. 8.

Referring to FIG. 9, the first carriage 94 includes first drums or pulleys 122 and the belt 70 is wrapped around portions of the first pulleys 122. The first carriage 94 further includes a first frame 126 supporting the first pulleys 122, and the first frame 126 is supported for movement (e.g., by rollers—not shown) along the rails 114 of the standard modules 110. The first carriage 94 may be movable in a direction parallel to the belt axis 116 (e.g., a first direction 174 and a second direction 178—FIG. 7). The first carriage 94 is tethered to the winch module 90 by a cable or rope (not shown), and may be connected in a multi-lap reeved rope configuration.

In one embodiment, the winch module 90 is driven by a variable speed gearbox and motor (not shown) and controlled by a feedback loop in communication with a load cell (not shown) that senses the tension of the belt 70. If the winch module 90 pays out cable, the first carriage 94 is permitted to move along the rails 114 in order to maintain a desired tension in the belt 70. Similarly, the winch module 90 may reel in the cable to move the first carriage 94 toward the winch module 90. The winch module 90 controls the movement of the first carriage 94 along the LTU 66 to vary the length of the belt 70 that is stored. The operation of the winch module 90 and the first carriage 94 may be consistent with a winch and movable carriage in a conventional loop take-up and would be understood by a person of ordinary skill in the art.

In one embodiment, moving the first carriage 94 away from the winch module 90 increases the travel length of the belt 70, thereby taking up slack in the belt 70 and increasing tension in the belt 70. Moving the first carriage 94 toward the winch module 90 decreases the travel length of the belt 70, thereby reducing tension in the belt 70. It is often necessary to add or remove belt 70 from the LTU 66 (e.g., as the overall conveyor length expands or contracts to accommodate the progress of the mining operation). In one embodiment, belt 70 is added when the gate conveyor 50 is extending and the first carriage 94 travels close to the second carriage 98 (FIG. 8), and belt 70 is removed when the gate conveyor 50 is retracting and the first carriage 94 travels close to the winch module 90.

Figure 10:
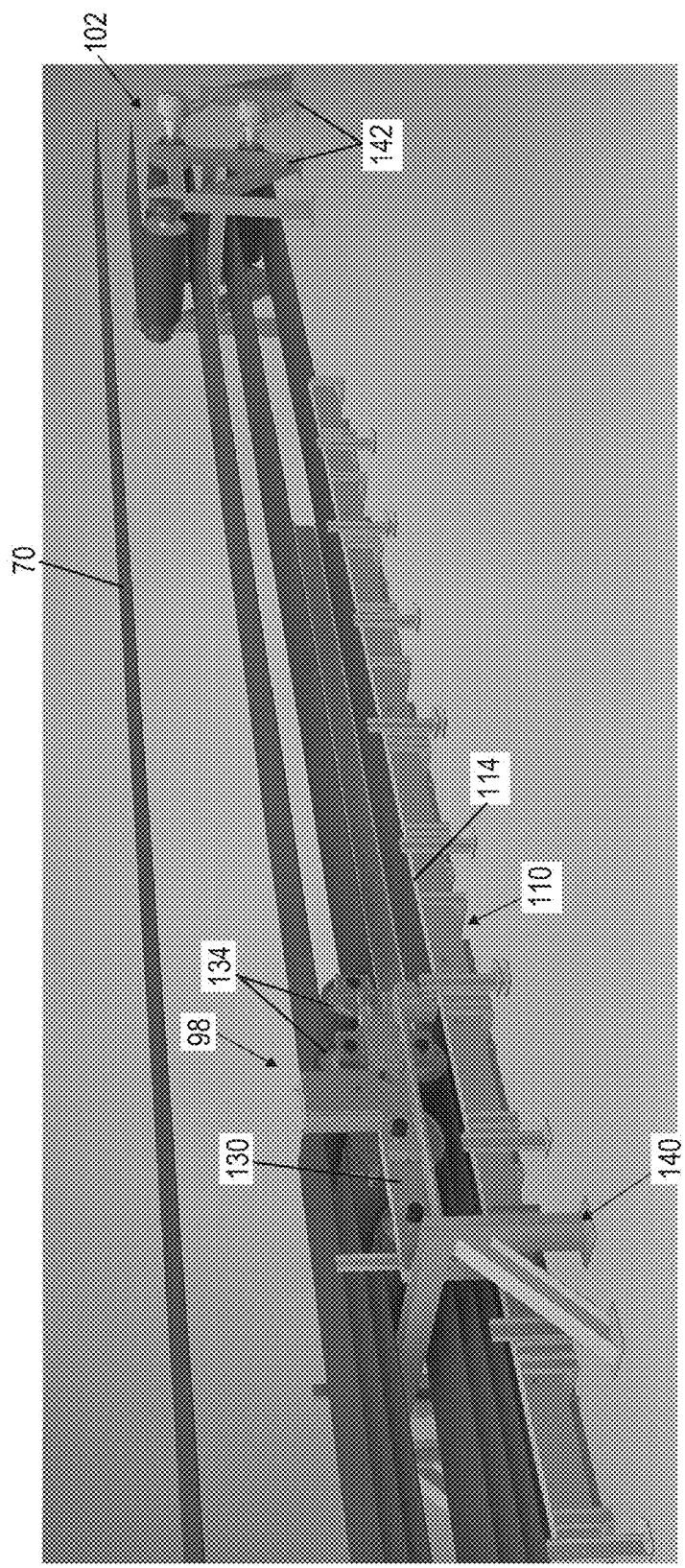
FIG. 10 is a perspective view of another end portion of the loop take-up of FIG. 8.

Referring now to FIG. 10, the second carriage 98 includes a second frame 130 supported for movement (e.g., by rollers—not shown) along the rails 114 of the standard modules 110. The second carriage 98 also includes second drums or pulleys 134 supported on the second frame 130, and the belt 70 is wrapped around portions of the second pulleys 134. The second carriage 98 also includes a return drum or return pulley 138.

The LTU 66 also includes a stop frame 140 positioned between the winch module 90 and the brake frame 102 (i.e., between the out-bye end and the in-bye end). In the illustrated embodiment, the stop frame 140 is anchored to a mine floor 106 independent of the standard modules 110 and is positioned adjacent the second carriage 98.

Figure 11:
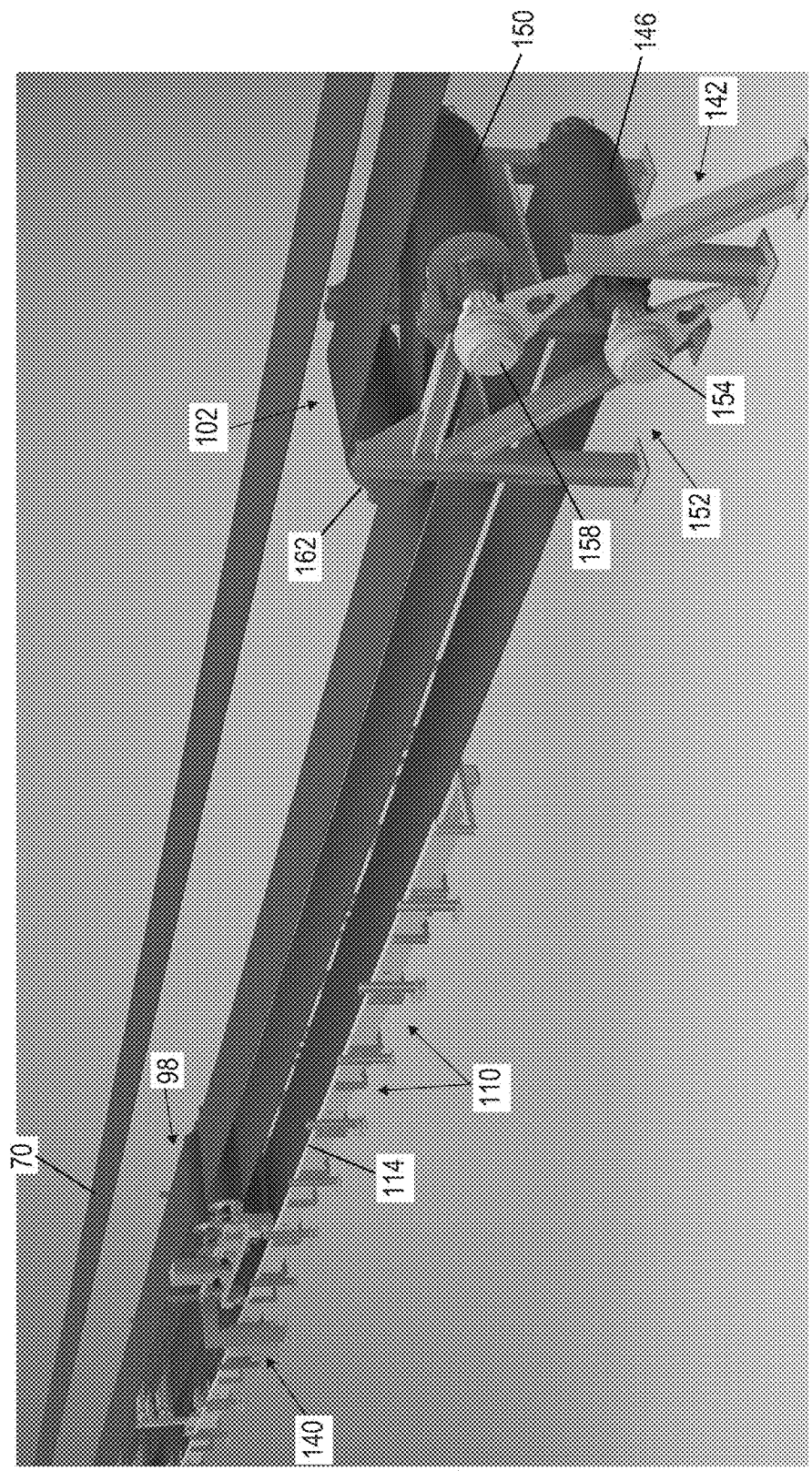
FIG. 11 is a perspective view of the end portion of the loop take-up of FIG. 10.

As shown in FIG. 11, the brake frame 102 includes a frame structure 142 supporting a first braked drum or pulley 146 and a second braked drum pulley 150. The brake frame 102 further includes a brake system 152 including a first brake 154 coupled to the first braked pulley 146 and a second brake 158 coupled to the second braked pulley 150. In the illustrated embodiment, the second braked pulley 150 and second brake 158 are positioned above the first braked pulley 146 and first brake 154.

The first braked pulley 146 receives and supports a portion of the return run of the belt 70 from the standard modules 110. The belt 70 wraps around the first braked pulley 146 and then wraps around the return pulley 138 on the second carriage 98. The belt 70 then passes to the brake frame 102 and wraps around the second braked pulley 150. In the illustrated embodiment, the brake frame 102 also includes a third drum or pulley 162 receiving the belt 70 from the second braked pulley 150. The return run of the belt 70 then travels toward the in-bye end of the gate conveyor 50.

Referring to FIGS. 11 and 12, each brake 154, 158 includes a member 166 (e.g., a plate—FIG. 12) coupled to an end of the respective braked pulley 146, 150 and rotatable with the braked pulley 146, 150. Each brake 154, 158 includes an arm 170 (FIG. 12) coupled to a portion of the structure 142 of the brake frame 102 and providing a reaction torque. In some embodiments, each brake 154, 158 is a "wet" disc brake in which the components are enclosed within a housing 172 filled with fluid. Each brake 154, 158 may include one or more rotors or discs coupled to the end of the braked pulley 146, 150 by a shaft such that the discs rotate with the shaft. Each brake 154, 158 also includes one or more friction elements or pads (not shown) and a braking actuator (e.g., springs—not shown) biasing the pads toward the discs.

The brakes 154, 158 may be various types of brakes. One example of a commercially available enclosed wet brake is the A+ Brake (Hydraulic Service/Spring Applied Brake), Model No. PTT-381-0, available from PT Tech, Inc. Other aspects regarding the structure and/or operation of a wet disc brake is understood by a person of ordinary skill in the art.

During normal operation, one or more fluid actuators (e.g., hydraulic pistons) exert a force to compress the springs and maintain separation between the discs and the pads. During braking, the fluid pressure in the actuators is reduced, and the biasing force of the springs moves the pad(s) into contact with the disc, thereby slowing rotation of the disc and the associated braked pulley 146, 150. A hydraulic system may be configured so that pressurized fluid may be bled from the actuators in a controlled manner (e.g., via a valve) to control the engagement between the disc and the pad(s).

In some applications, the conveyor system 50 is used in an underground mine environment and the outer surface of the housing 172 may not exceed a predetermined temperature (e.g., approximately 150 degrees Celsius). Each brake 154, 158 may be in fluid communication with accumulators (not shown) that provide cooling fluid when the brake is applied. For example, a valve that is open during normal operation may be activated during a power loss to release oil from the accumulators to permit cooling. Also, when the hydraulic system is under power, the fluid may be circulated through a radiator or other heat dissipation device to cool the fluid to a predetermined temperature. After a power interruption and subsequent restoration of power, the conveyor system 50 may be restarted once the fluid is cooled to the predetermined temperature and the fluid actuators are activated to separate the pads from the discs.

In FIG. 13, the second carriage 98 abuts the stop frame 140, thereby preventing the second carriage 98 from moving in a first direction 174 toward the winch module 90 (FIG. 8). In the illustrated embodiment, the second carriage 98 is not constrained against movement along the rails 114 in a second direction 178 opposite the first direction 174 (i.e., away from the winch module 90). During normal operation, a net force exerted on the second carriage 98 by a first portion 182 of the belt 70 positioned on the active side of the LTU 66 (e.g., the out-bye side of the second carriage 98) is greater than a second net force exerted on the second carriage 98 by a second portion 186 of the belt 70 extending between the second carriage 98 and the brake frame 102 (e.g., the in-bye side of the second carriage 98). This imbalance biases the second carriage 98 in the first direction 174, against the stop frame 140. In the illustrated configuration, the first portion 182 includes five strands or layers of belt 70 each with a tension of approximately 50 kN during normal operation (a net force of approximately 250 kN), while the second portion 186 includes two runs each with a tension of approximately 50 kN during normal operation (a net force of approximately 100 kN). In other embodiments, each portion 182, 186 of the belt 70 may be configured to include fewer or more strands and/or may be maintained at a different tension.

If the conveyor system experiences a power interruption or failure, the winch module 90 is not actively controlled and a failsafe brake engages and locks the winch drum on the winch module 90, locking the first carriage 94 in place. In addition, the loss of power causes the hydraulic pressure to release the pressure applied against the brake pads, allowing the pads to contact the discs and slow the braked pulleys. In addition, cooling fluid may be released from accumulators to cool the fluid in the brakes 154, 158.

As shown in FIG. 14, when the brakes 154, 158 are actuated, the brakes 154, 158 apply a torque to retard the rotation of the braked pulleys 146, 150 and thereby slow the travel of the second portion 186 of the belt 70. As a result, the net force exerted on the second carriage 98 by the second portion 186 of the belt 70 increases. In particular, the second brake 158 applies a torque exceeding the tension in the first portion 182 of the belt 70 and causes the second carriage 98 to move away from the stop frame 140, in the second direction 178. As the distance between the second carriage 98 and the first carriage 94 (FIG. 9) increases, an additional amount of the first portion 182 of the belt 70 is taken up by the LTU 66. In the illustrated embodiment, during braking, each strand in the first portion 182 transmits a tension of approximately 50 kN (net force of approximately 250 kN), while each strand in the second portion 186 transmits a tension of approximately 250 kN (net force of approximately 500 kN).

The second carriage 98 moves with sufficient speed to maintain a minimum tension in the belt 70 while the belt 70 is stopping, thereby preventing belt sagging. The brake system 152 is spaced apart from the stop frame 140 by a predetermined stopping distance to provide sufficient travel for the second carriage 98 so that the LTU 66 can take up the required amount of belt 70 during a stop. The first brake 154 applies additional torque and maintains overall stopping requirements for the LTU 66. In some embodiments, the brakes 154, 158 apply different torques. An operator may set the braking torque applied by each brake 154, 158 to maintain a required take-up speed, belt tension, and/or overall stopping time.

In a conventional conveyor system, the belt tension is controlled only while the conveyor is powered. If power is interrupted, the winch module 90 is not actively controlled and a failsafe brake engages and locks the winch drum on the winch module 90, locking the first carriage 94 in place. The tension in the belt 70 will equalize throughout the system, producing tension waves that travel through the belt 70 until the conveyor reaches a steady state. If the conveyor uses brakes to reduce or control speed for a system on a downhill incline, the dynamic effects on the belt 70 in combination with an unpowered winch module 90 will result in unacceptably low tension in portions of the belt 70, causing the belt 70 to slump between support rolls. This results in spillage of the material on the conveyor 50, and damage to the belt 70 when the conveyor 50 is restarted. Some conveyors may implement a gravity tower tension device, which uses potential energy of an elevated mass to provide tension during a stop. However, an underground mining operation imposes severe restrictions on the use of a gravity tower due to the space needed to install the tower structure that supports the mass as well as the difficulty in re-locating the gravity tower as the mining operation progresses.

In contrast, the brake system 152 uses tension forces induced in the belt 70 during braking or retarding to permit the belt storage length to be varied during an un-powered conveyor stop (e.g., when the conveyor system loses power). The imbalance between the forces exerted on the second carriage 98 by the first portion 182 and the second portion 186 of the belt 70 is sufficient to move the second carriage 98 toward the brake frame 102 (e.g. in-bye, or to the right in FIG. 14) and permits additional belt length to be taken up by the LTU 66. The energy of the unpowered take-up movement of the second carriage 98 is transmitted to the conveyor system without requiring operator intervention.

The brake system 152 provides belt tension control during a stop without requiring a separate gravity-based tension device. Also, as the mining operation progresses, the brake system 152 can also be relocated with less effort than would be needed with a gravity-based tension device. In addition, belt stretch generated during braking is accommodated by kinetic energy stored in the conveyor 50 without requiring another form of stored energy like the suspended mass of the gravity tower. The system 152 also eliminates the safety risk associated with exposing operators to stored energy like a suspended mass. Furthermore, the brake system 152 does not require a powered control system, since the brakes 154, 158 are engaged automatically or manually via unpowered controls (e.g., hydraulic controls) during a power interruption. The brake system 152 permits the conveyor system to operate in normal modes without interlocks or latches.

Although aspects have been described in detail with reference to certain preferred embodiments, variations and modifications exist within the scope and spirit of one or more independent aspects as described and claimed.

What is claimed is:
1. A braking device for a conveyor system, the conveyor system including a continuous belt driven in a direction of travel, the braking device comprising:
   a carriage supported for movement in a direction parallel to the direction of travel of the belt, the carriage including a plurality of rolls and at least one return pulley, the plurality of rolls configured to support a portion of the belt;
   a brake pulley configured to support a portion of the belt extending from the return pulley; and
   a brake selectively retarding rotation of the brake pulley.

2. The braking device of claim 1, wherein the brake pulley is a first brake pulley and the brake is a first brake, wherein the braking device further includes a second brake pulley and a second brake for selectively retarding rotation of the second brake pulley, the first brake pulley and the second brake pulley configured to support a portion of the belt, wherein the belt passes around the first brake pulley, then passes around the return pulley, and then passes around the second brake pulley.

3. The braking device of claim 2, wherein actuation of the first brake and the second brake increases a tension in a portion of the belt extending between the first brake pulley and the carriage to a level greater than a tension in a portion of the belt extending from the carriage and away from the first brake pulley.

4. The braking device of claim 1, wherein actuation of the brake increases a tension in a portion of the belt extending between the brake pulley and the carriage to a level greater than a tension in a portion of the belt extending from the carriage and away from the brake pulley.

5. The braking device of claim 1, wherein the brake includes an enclosed fluid disk brake coupled to an end of the brake pulley, actuation of the brake applying friction to the end of the brake pulley to reduce the speed of the brake pulley.

6. The braking device of claim 1, further comprising a stop member engaging the carriage to prevent movement of the carriage in at least one direction.

7. The braking device of claim 6, wherein the carriage is positioned between the stop member and the brake pulley.

8. The braking device of claim 1, wherein retarding rotation of the brake pulley causes a force exerted on the carriage by a portion of the belt extending between the carriage and the brake pulley to exceed a force exerted on the carriage by a portion of the belt extending away from the brake pulley.

9. A tensioning mechanism for a conveyor system including a continuous belt and a support structure, the tensioning mechanism comprising:
   a first carriage supported for movement relative to the support structure, the first carriage including a plurality of first rolls for receiving the belt such that movement of the first carriage modifies a tension in the belt;
   a second carriage supported for movement relative to the support structure, the second carriage including a plurality of second rolls and at least one return pulley, the plurality of second rolls configured to receive a portion of the belt from the first carriage;

a brake pulley for receiving a portion of the belt from the return pulley; and a brake selectively retarding rotation of the brake pulley.

10. The tensioning mechanism of claim 9, further comprising an actuator coupled to the first carriage for moving the first carriage in a direction parallel to a longitudinal axis of the support structure, the actuator including a winch drum and a cable wrapped onto the winch drum.

11. The tensioning mechanism of claim 9, wherein the brake pulley is a first brake pulley and the brake is a first brake, further comprising a second brake pulley and a second brake for selectively retarding rotation of the second brake pulley, the first brake pulley and the second brake pulley configured to receive a portion of the belt extending from the second carriage, wherein the belt passes around the first brake pulley, then passes around the return pulley, and then passes around the second brake pulley.

12. The tensioning mechanism of claim 11, wherein actuation of the first brake and the second brake increases a tension in the portion of the belt extending between the brake pulleys and the second carriage to a level greater than a tension the portion of the belt extending between the first carriage and the second carriage.

13. The tensioning mechanism of claim 9, wherein the brake includes an enclosed fluid disk brake coupled to an end of the brake pulley, actuation of the brake applying friction to the end of the brake pulley to reduce the speed of the brake pulley.

14. The tensioning mechanism of claim 9, further comprising a stop member positioned between the first carriage and the second carriage, the stop member engaging the second carriage to prevent movement of the second carriage toward the first carriage.

15. A method for conveying material, the method comprising:

driving a continuous belt between a receiving end and a discharge end, the belt including a first portion and a second portion, the first portion extending between a first carriage and a second carriage and exerting a first force on the second carriage, the second portion extending between the second carriage and at least one braking pulley and exerting a second force on the second carriage;

while power is supplied to a conveyor drive motor, operating a tensioning mechanism in a first mode including selectively moving the first carriage relative to the second carriage to adjust a tension in the continuous belt, the first force being greater than the second force; and while power to the conveyor drive motor is interrupted, operating the tensioning mechanism in a second mode including retarding rotation of the at least one braking pulley, the second force being greater than the first force.

16. The method of claim 15, wherein operating the tensioning mechanism in the first mode includes providing pressurized fluid to a brake to maintain separation between a friction element and a member driven by rotation of the pulley, wherein retarding rotation of the at least one pulley includes releasing the pressurized fluid to permit contact between the friction element and the member.

17. The method of claim 15, wherein retarding rotation of the at least one braking pulley includes moving the second carriage away from the first carriage.

18. The method of claim 15, wherein operating the tensioning mechanism in the first mode includes inhibiting movement of the second carriage against the first carriage.

19. The method of claim 15, wherein operating the tensioning mechanism in the first mode includes controlling actuation of a winch coupled to the first carriage to adjust a position of the first carriage relative to the second carriage.

20. The method of claim 15, wherein retarding rotation of the at least one braking pulley includes retarding rotation of a pair of braking pulleys, the pair of braking pulleys engaging a second portion of the belt.

* * * * *